United States Patent
Matsumoto et al.

(10) Patent No.: US 9,253,398 B2
(45) Date of Patent: Feb. 2, 2016

(54) IMAGING APPARATUS FOR GENERATING COMPOSITE IMAGE USING DIRECTIONAL INDICATOR IMAGE, AND METHOD AND RECORDING MEDIUM WITH PROGRAM RECORDED THEREIN FOR THE SAME

(71) Applicant: Casio Computer Co., Ltd., Shibuya-ku, Tokyo (JP)

(72) Inventors: Kosuke Matsumoto, Akishima (JP); Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/514,006

(22) Filed: Oct. 14, 2014

(65) Prior Publication Data

US 2015/0029305 A1    Jan. 29, 2015

Related U.S. Application Data

(62) Division of application No. 13/051,269, filed on Mar. 18, 2011, now abandoned.

(30) Foreign Application Priority Data

Mar. 19, 2010  (JP) .................... 2010-063763

(51) Int. Cl.
   *H04N 5/232* (2006.01)
   *H04N 5/272* (2006.01)
(52) U.S. Cl.
   CPC ....... *H04N 5/23238* (2013.01); *H04N 5/23222* (2013.01); *H04N 5/23293* (2013.01); *G06T 2207/20132* (2013.01); *H04N 5/272* (2013.01)

(58) Field of Classification Search
   None
   See application file for complete search history.

(56) References Cited

U.S. PATENT DOCUMENTS

| | | | |
|---|---|---|---|
| 7,042,504 | B1 | 5/2006 | Toyofuku et al. |
| 7,424,218 | B2 * | 9/2008 | Baudisch et al. ............. 396/322 |
| 7,561,788 | B2 | 7/2009 | Kobayashi et al. |
| 8,068,694 | B2 | 11/2011 | Zhang et al. |

(Continued)

FOREIGN PATENT DOCUMENTS

| | | |
|---|---|---|
| CN | 101674409 A | 3/2010 |
| JP | 11-069293 A | 3/1999 |

(Continued)

OTHER PUBLICATIONS

Japanese Office Action dated Jan. 23, 2012 (and English translation thereof) in counterpart Japanese Application No. 2010-063763.

(Continued)

*Primary Examiner* — Albert Cutler
(74) *Attorney, Agent, or Firm* — Holtz, Holtz & Volek PC

(57) ABSTRACT

An imaging apparatus include a display section, a capturing section which captures an image at a first viewing angle, a capturing control section which performs a plurality of capturing operations by the capturing section, a generation section which generates a composite image reproducing an image captured at a second viewing angle that is wider than the first viewing angle by combining a plurality of images acquired by the plurality of capturing operations by the capturing control section, and a display control section which displays the composite image generated by the generation section on the display section.

18 Claims, 14 Drawing Sheets

(56) References Cited

U.S. PATENT DOCUMENTS

| | | | |
|---|---|---|---|
| 8,330,797 B2 * | 12/2012 | Kim et al. | 348/36 |
| 8,390,672 B2 | 3/2013 | Ryu et al. | |
| 2004/0189849 A1 | 9/2004 | Hofer | |
| 2007/0058961 A1 | 3/2007 | Kobayashi et al. | |
| 2009/0058990 A1 | 3/2009 | Kim et al. | |
| 2012/0092522 A1 | 4/2012 | Zhang et al. | |

FOREIGN PATENT DOCUMENTS

| | | |
|---|---|---|
| JP | 2000-305207 A | 11/2000 |
| JP | 2001-008081 A | 1/2001 |
| JP | 2004-096156 A | 3/2004 |
| JP | 2004-191897 A | 7/2004 |
| JP | 2004-304801 A | 10/2004 |
| JP | 2005-027142 A | 1/2005 |
| JP | 2005-057548 A | 3/2005 |
| JP | 2005-303594 A | 10/2005 |
| JP | 2007-081473 A | 3/2007 |
| JP | 2008-263538 A | 10/2008 |
| JP | 2008-289095 A | 11/2008 |
| WO | WO 2008/087721 A1 | 7/2008 |

OTHER PUBLICATIONS

Chinese Office Action dated Feb. 27, 2013 (and English translation thereof) in counterpart Chinese Application No. 201110126233.2.
Japanese Office Action dated Jan. 14, 2014 (and English translation thereof) in counterpart Japanese Application No. 2012-060836.

* cited by examiner

IMAGING APPARATUS FOR GENERATING COMPOSITE IMAGE USING DIRECTIONAL INDICATOR IMAGE, AND METHOD AND RECORDING MEDIUM WITH PROGRAM RECORDED THEREIN FOR THE SAME

CROSS-REFERENCE TO RELATED APPLICATION

This is a Divisional of U.S. application Ser. No. 13/051,069, filed Mar. 18, 2011, which is based upon and claims the benefit of priority from prior Japanese Patent Application No. 2010-063763, filed Mar. 19, 2010, the entire contents of both of which are incorporated herein by reference.

BACKGROUND OF THE INVENTION

1. Field of the Invention

The present invention relates to an imaging apparatus and a recording medium with a program recorded therein.

2. Description of the Related Art

In digital cameras, mobile phones having an imaging function, etc., the limit of a viewing angle is dependent on the hardware specification of the device body, such as the focal distance of the lens, the size of the image sensor, and the like.

As a solution to the problem of this viewing angle limit, there is a technique in which a conversion lens for wide-angle imaging or the like is attached in front of a preexisting lens in an imaging apparatus (such as Japanese Patent Application Laid-Open (Kokai) Publication Nos. 2004-191897, 2005-027142, and 2005-057548). In addition, a technique is also known in which a plurality of lenses are provided in advance, and the lenses are switched depending on the intended imaging operation (such as Japanese Patent Application Laid-Open (Kokai) Publication No. 2007-081473).

However, in the above-described conventional technologies, the conversion lens for wide-angle imaging is required to be attached or the lenses are required to be switched depending on the intended imaging operation, every time wide-angle imaging is performed. Accordingly, there are problems regarding operability and costs. In addition, even with conversion lenses for wide-angle imaging or switchable lenses, the user still has difficulty in acquiring a desired wide-angle image.

An object of the present invention is to provide an imaging apparatus and a recording medium with a program recorded therein by which wide-angle images can be easily acquired.

SUMMARY OF THE INVENTION

In order to achieve the above-described object, in accordance with one aspect of the present invention, there is provided an imaging apparatus comprising: a display section, a capturing section which captures an image at a first viewing angle, a capturing control section which performs a plurality of capturing operations by the capturing section, a generation section which generates a composite image reproducing an image captured at a second viewing angle that is wider than the first viewing angle by combining a plurality of images acquired by the plurality of capturing operations by the capturing control section, and a display control section which displays the composite image generated by the generation section on the display section.

In accordance with another aspect of the present invention, there is provided a non-transitory computer-readable storage medium having stored thereon a program that is executable by a computer in an imaging apparatus including a capturing section which captures an image at a first viewing angle and a display section, the program being executable by the computer to perform a process comprising: capturing control processing for performing a plurality of capturing operations by the capturing section; generation processing for generating a composite image reproducing an image captured at a second viewing angle that is wider than the first viewing angle by combining a plurality of images acquired by the plurality of capturing operations in the capturing control processing; and display control processing for displaying on the display section the composite image with the second viewing angle generated in the generation processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The preferred embodiments of the present invention will hereinafter be described with reference to the drawings. However, the scope of the invention is not limited to the illustrated examples.

A. First Embodiment

A-1. Configuration of the First Embodiment

Figure 1:
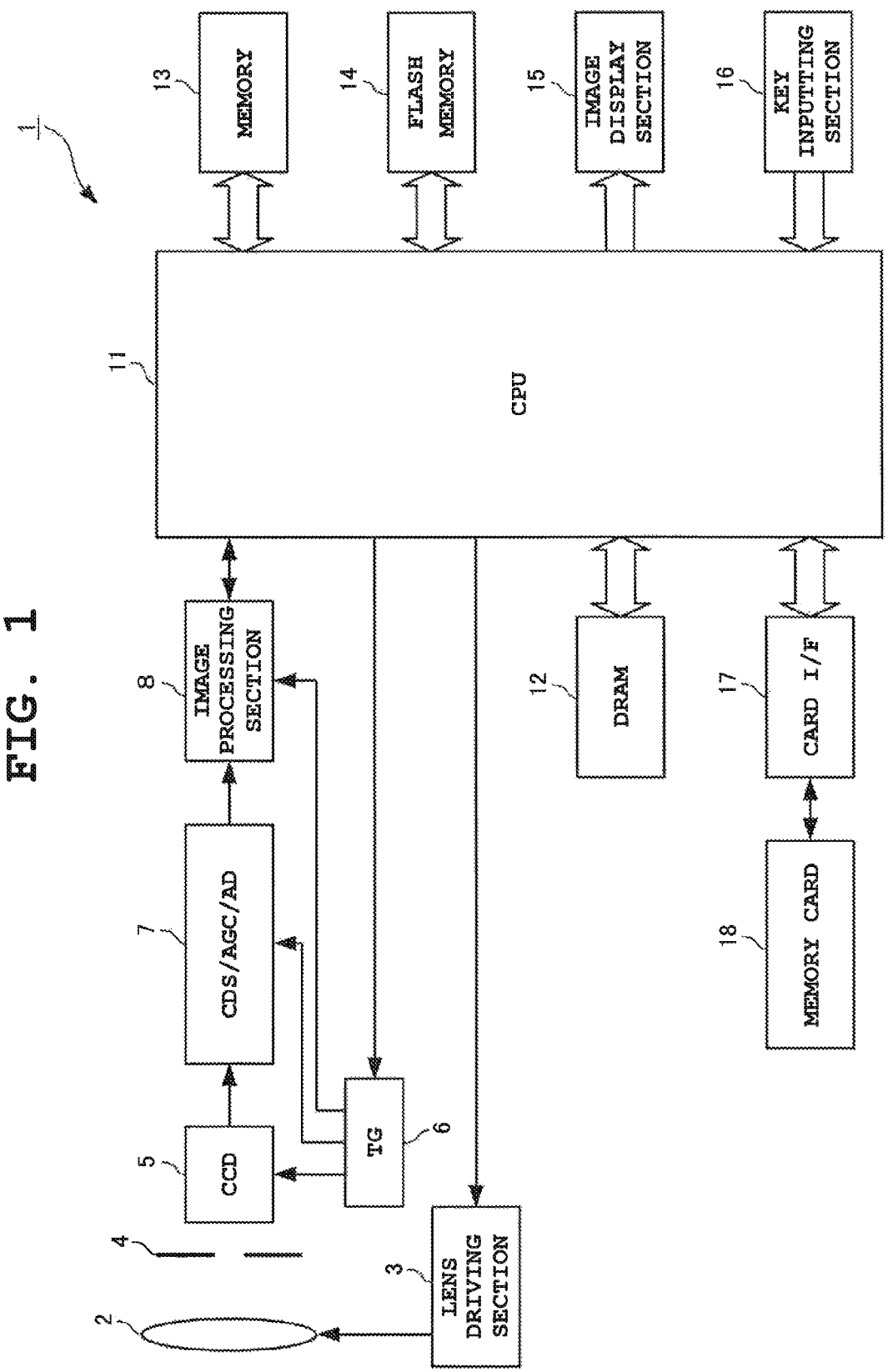
FIG. 1 is a block diagram showing the structure of a digital camera according to a first embodiment of the present invention.

FIG. 1 is a block diagram showing the structure of a digital camera according to a first embodiment of the present invention. In FIG. 1, a digital camera 1 includes an imaging lens 2, a lens driving section 3, a shutter-aperture 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5 (capturing section), which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format, or Moving Picture Experts Group (MPEG) format), processing for combining a plurality of captured images, etc.

The CPU 11 (imaging control section, generation section, display control section, first judgment section, first notification section, second judgment section, second notification section, and trimming section) is a single-chip microcomputer that controls each section of the digital camera 1. In particular, according to the first embodiment, the CPU 11 controls each section such that a plurality of images are continuously captured at a predetermined cycle (time interval), the captured images are combined so that they are partially overlapped with each other (such as by α-blending), and a single composite image that appears to have been captured at a wide angle is generated. The details of this image composition will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 (display section) includes a color liquid crystal display (LCD) and a driver circuit thereof. In an imaging stand-by state, the image display section 15 displays a subject captured by the CCD 5 as a through image. Also, the image display section 15 displays a recorded image that has been read out from the flash memory 14 or the memory card 23 and expanded when it is replayed. In addition, according to the first embodiment, the image display section 15 in the wide-angle imaging mode displays a composite image generated by a plurality of continuously captured images being sequentially combined. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Figure 2:
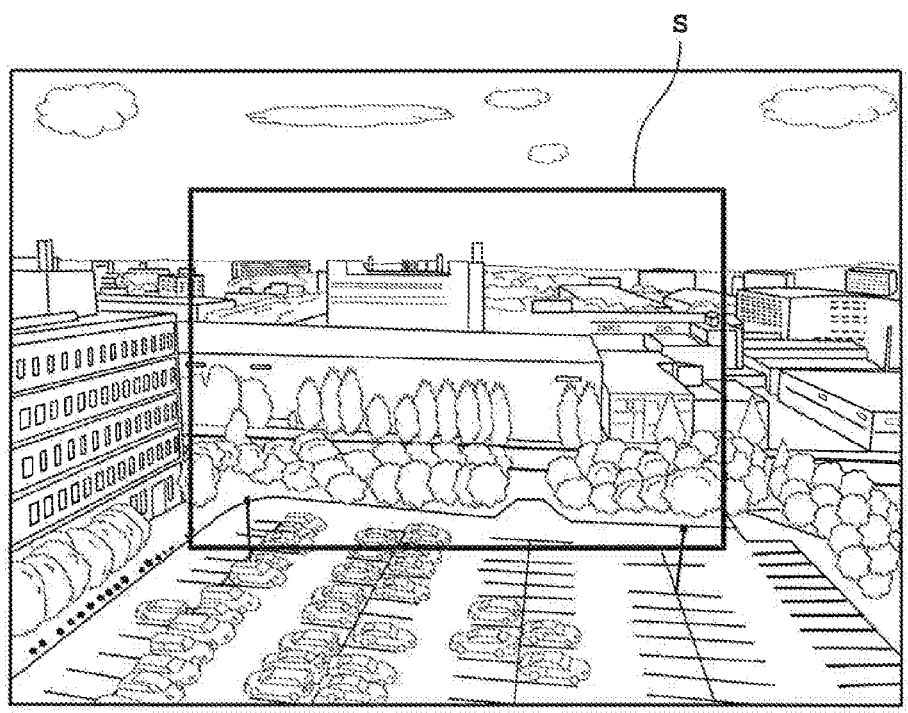
FIG. 2 is a conceptual diagram for explaining a wide-angle imaging mode of a digital camera 1 according to the first embodiment.

FIG. 2 is a conceptual diagram for explaining the wide-angle imaging mode of the digital camera 1 according to the first embodiment. For example, suppose the case where a landscape such as that shown in FIG. 2 is to be captured by the digital camera 1. A viewing angle that is wider than a viewing angle S of the imaging system of the digital camera 1 is required to capture the landscape of the desired area. Accordingly, in this case, the entire desired landscape cannot be captured by a single shot.

In the first embodiment, the wide-angle imaging mode is provided in which, while the user is moving the capturing direction of the digital camera 1 to cover a desired landscape, a plurality of images are continuously captured at a predetermined cycle (time interval) over a predetermined amount of time or for a predetermined number of images, and the captured images are combined so that they are partially overlapped with each other, whereby an image with a wide viewing angle can be easily acquired.

Figure 3:
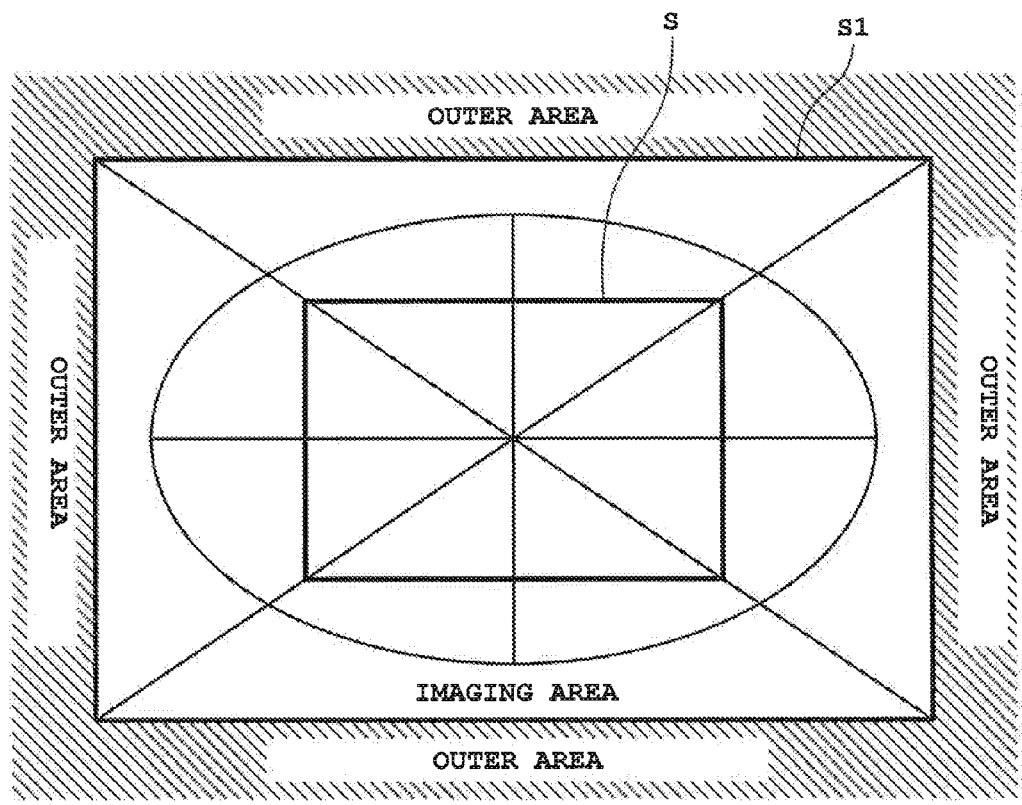
FIG. 3 is a conceptual diagram showing a relationship between the viewing angle of a lens and a composite image acquired in the wide-angle imaging mode in the digital camera 1 according to the first embodiment.

In the description below, the landscape shown in FIG. 2 will be described, being schematized as shown in FIG. 3 to clarify the imaging area, the viewing angle for imaging, etc. In FIG. 3, a viewing angle S1 is the size (viewing angle) of an image ultimately generated. Even if the outer side is captured, this outer area is not saved in the final image.

In the first embodiment, an array for writing an image is secured in the memory (DRAM 12). This array is referred to as a canvas for convenience. The canvas indicates an imaging area that is produced by a generated composite image with a wide viewing angle. That is, a plurality of captured images that are positioned and combined so as to be partially overlapped with each other overwrite the canvas. Then, the area on the canvas in which the image has been written is extracted from the composite image, whereby an image with a wide viewing angle is generated. In the first embodiment, with a first image captured in the wide-angle imaging mode serving as a reference image (equivalent to the image at the viewing angle S in FIG. 3), an area that is, for example, twice the height and twice the width of the reference image is set as the canvas (the imaging area S1 in FIG. 3). Then, the reference image is pasted in the center of the canvas. Note that the size of the canvas may be other than twice the height and width.

Also note that block matching, for example, can be used as a method for the positioning. In addition, a method can be used in which projection conversion or the like is performed and the images are overlapped using a technique such as α-blending, as a method to overwrite the canvas.

Figure 4:
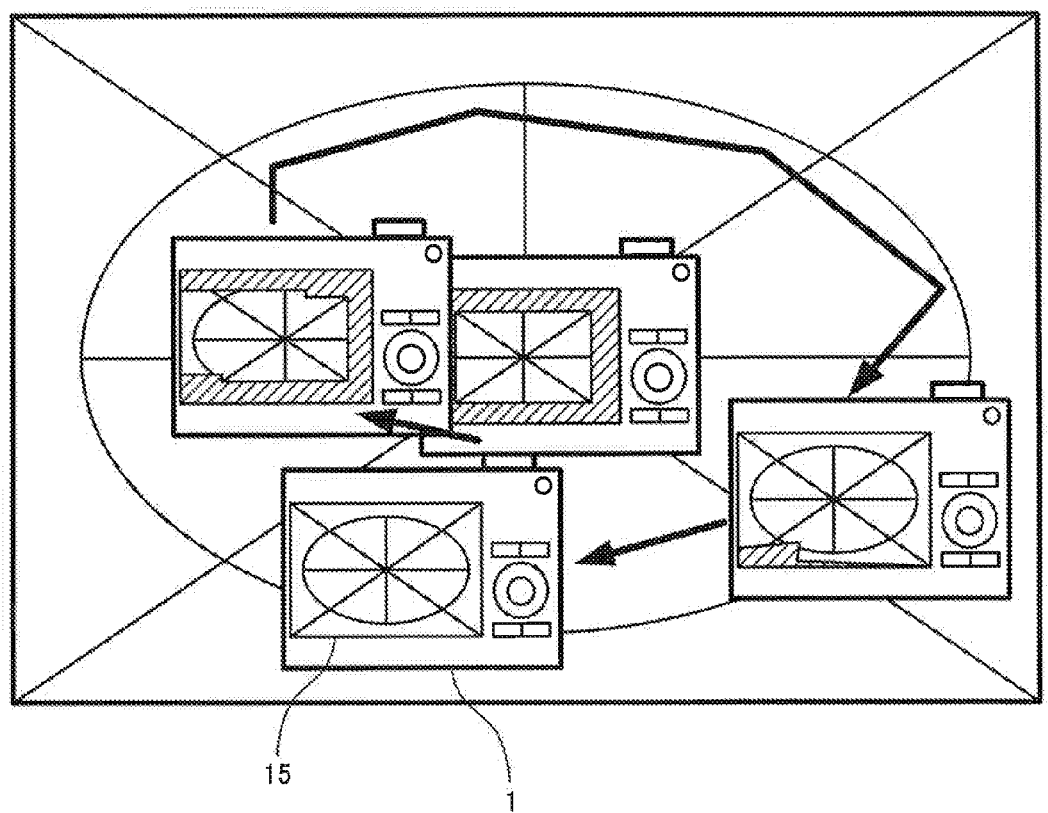
FIG. 4 is a schematic diagram for explaining user operation in the wide-angle imaging mode of the digital camera 1 according to the first embodiment.

FIG. 4 is a schematic diagram for explaining user operation in the wide-angle imaging mode of the digital camera 1 according to the first embodiment. When capturing a desired landscape, the user, for example, moves the digital camera 1 in a circular motion while depressing (half-depression→full depression) the shutter SW towards the center area, as indicated by the arrow in FIG. 4. However, it is hard for the user to know how to move the digital camera 1 or whether or not necessary images are being taken without fail.

Therefore, in the first embodiment, when the user depresses (half-depression→full depression) the shutter SW, a plurality of images are continuously captured at a predetermined cycle (time interval) over a predetermined amount of time or for a predetermined number of images, as described above. Every time an image is captured by this continuous capturing, its reduced image (low resolution) is generated in real-time and combined with the reference image (or composite image) so that they are partially overlapped with each other, and the composite image is displayed on the image display section 15. At this time, the original image (high-quality image) of the reduced image used for the image composition is stored.

Then, when the imaging over a predetermined amount of time or for a predetermined number of images is completed, the original images (high-quality images) stored as described above are combined so as to be partially overlapped, as in the case of the image composition performed using the reduced image. As a result of this series of processing, an image with a wide viewing angle that cannot be acquired by a single shot is generated. In the first embodiment, since combined reduced images are displayed on the image display section 15 during continuous image capturing, the user can easily confirm a direction in which the digital camera should be pointed.

A-2. Operations of the First Embodiment

Next, operations of the above-described first embodiment will be described.

Figure 5:
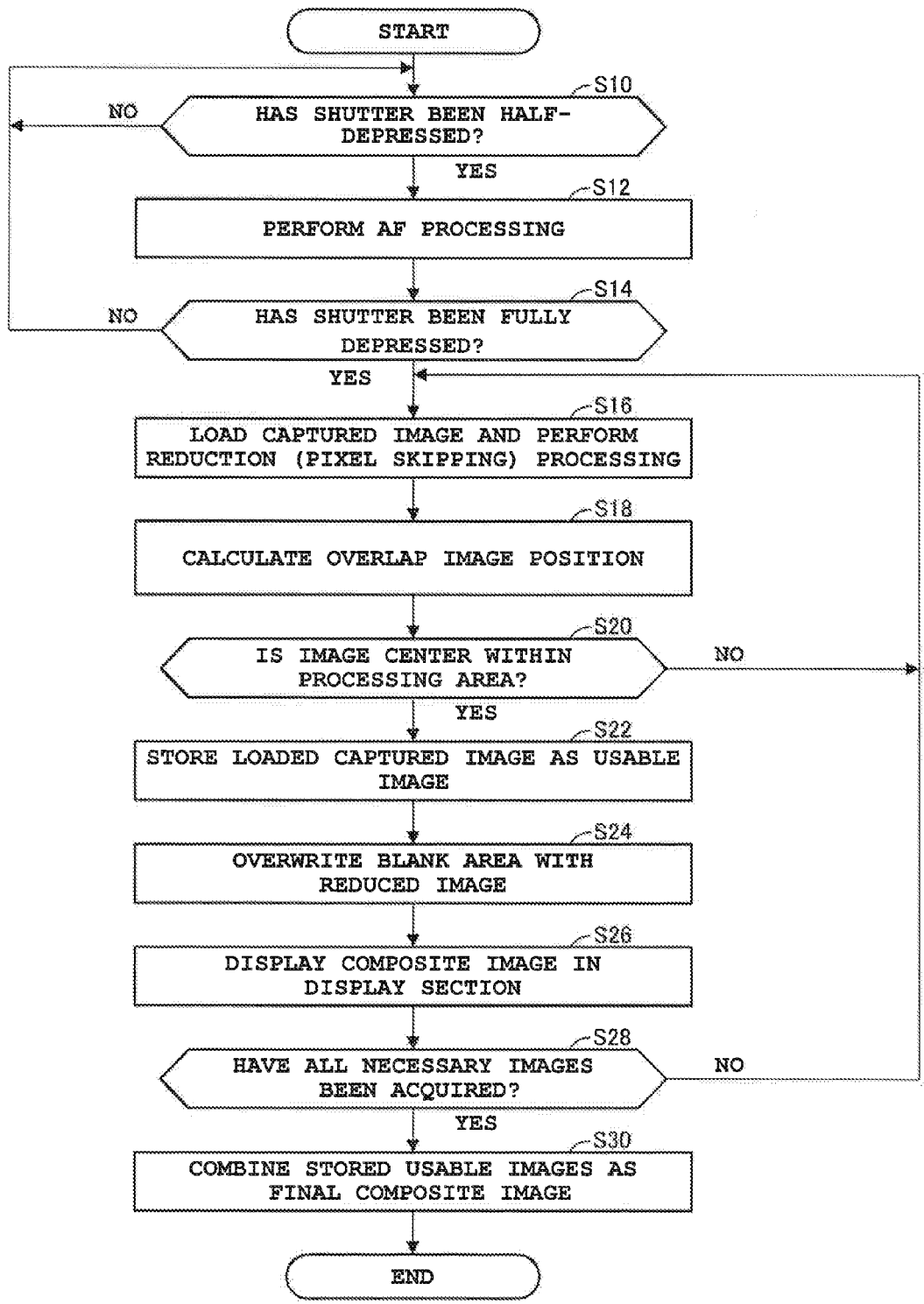
FIG. 5 is a flowchart for explaining operations of the digital camera 1 according to the first embodiment.
Figure 6A:
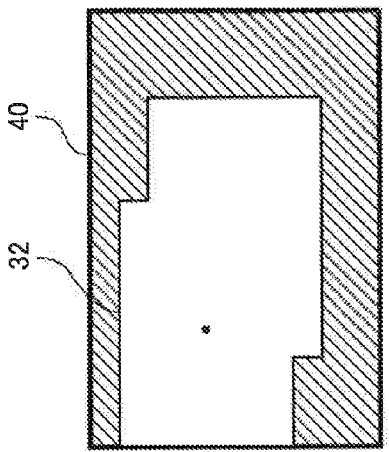
FIG. 6A and FIG. 6B are schematic diagrams for explaining image composition in the wide-angle imaging mode in the digital camera 1 according to the first embodiment.
Figure 6A:
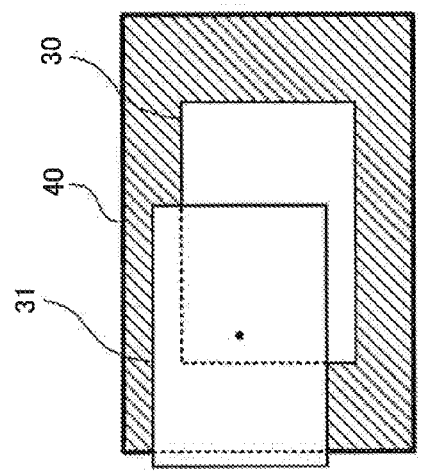
Figure 6A:
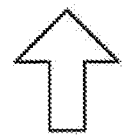
Figure 6B:
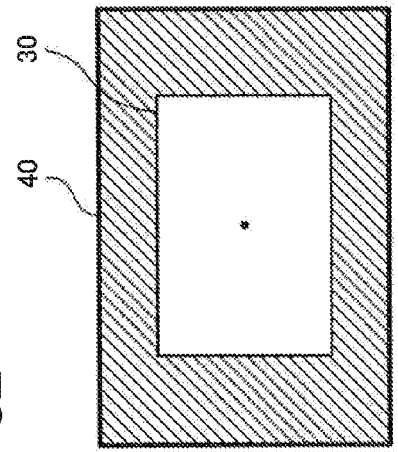
Figure 6B:
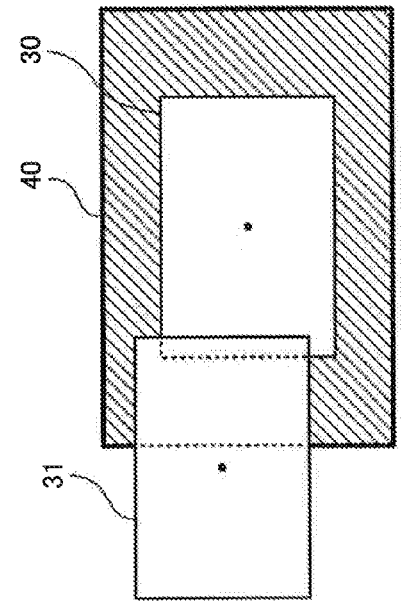
Figure 6B:
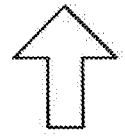

FIG. 5 is a flowchart for explaining operations of the digital camera 1 according to the first embodiment. FIG. 6A and FIG. 6B are schematic diagrams for explaining image composition in the wide-angle imaging mode of the digital camera 1 according to the first embodiment.

First, the CPU 11 judges whether or not the shutter SW has been half-depressed (Step S10). When judged that the shutter SW has not been half-depressed, the CPU 11 repeatedly performs Step S10. Conversely, when judged that the shutter SW has been half-depressed, the CPU 11 performs auto-focus (AF) processing (Step S12) and judges whether or not the shutter SW has been fully depressed (Step S14). When judged that the shutter SW has not been fully depressed, the CPU 11 repeatedly performs Step S10 and Step S12.

Conversely, when judged that the shutter SW has been fully depressed, the CPU 11 first loads the captured image, and generates its reduced image (Step S16) by performing reduction processing (pixel skipping). Next, the CPU 11 calculates an overlap image position using the reduced image (Step S18). Note that the calculation of an overlap image position herein refers to, for example, a calculation in which the center position (coordinates) of a reduced image is calculated and, if the reference image (or composite image) is already present, the reduced image of the current frame and the reference image (or composite image) are positioned so as to be partially overlapped with each other, and the position of the reduced image of the current frame within the canvas is calculated. Next, based on the center position of the reduced image and the position within the canvas, the CPU 11 judges whether or not the center position of the reduced image is within the processing area (within the canvas) (Step S20).

When judged that the center position of the reduced image is within the processing area, the CPU 11 stores the loaded captured image (high resolution) as a usable image (Step S22) and overwrites the blank area that is an un-captured area with the reduced image (Step S24). That is, when the center position of the reduced image of the current frame is within the processing area, the reduced image of the current frame and the reference image (or composite image) are combined so as to be partially overlapped with each other, and the canvas 40 is overwritten with the composite image (when the captured image is a first captured image, the center portion of the canvas 40 is overwritten with the image as a reference image). In the example shown in FIG. 6A, since the center position of the reduced image 31 of the current frame is within the canvas 40, the CPU 11 combines the reduced image 31 of the current frame and a reference image 30 so that they are partially overlapped with each other, and overwrites the canvas 40 with the composite image 32. Then, the CPU 11 displays the composite image 32 on the image display section 15 (Step S26).

Next, the CPU 11 judges whether or not all images necessary to generate an image with a wide viewing angle have been acquired (for example, whether or not the number of images equivalent to a predetermined amount of time or a predetermined number of images has been acquired) (Step S28). When judged that not all necessary images have been acquired, the CPU 11 returns to Step S16 and repeats the same processing on the captured image of the next frame. As a result, every time an image is captured and the center position of the captured image is within the processing area, the image and the reference image (or composite image) are combined, and the composite image is displayed on the image display section 15, in sequential order.

Conversely, when the center position of the reduced image of the current frame is not within the processing area, the CPU 11 returns to Step S16, and repeats the same processing on the next captured image. For example, as shown in FIG. 6B, image composition is not performed when the center position of the reduced image 31 of the current frame is not within the canvas 40.

When all necessary images are acquired, the CPU 11 positions and combines the stored usable images that are the original images of the reduced images used for the image composition so that they are partially overlapped, as in the case of the image composition performed using the reduced images. Consequently, an image with a wide viewing angle such as that shown in FIG. 2 is generated (Step S30).

According to the above-described first embodiment, every time an image is captured during continuous image capturing, its reduced image that has been combined with the reference image is displayed on the image display section 15 in real-time. As a result, the user can easily confirm directions that have not yet been captured and directions that have already been captured. Therefore, the user can easily know a direction in which the digital camera should be pointed next, whereby an image with a wide viewing angle can be easily and efficiently acquired.

B. Second Embodiment

Next, a second embodiment of the present invention will be described.

The second embodiment is characterized in that, when, for example, an area outside of a processing area (off-canvas) is being captured or the moving speed of the digital camera 1 (change in the image capturing direction) is too fast, the user is notified thereof, whereby an approximate speed at which the digital camera 1 should be moved, and a direction in which the digital camera 1 should be pointed are confirmed. Note that the structure of the digital camera 1 is the same as that in FIG. 1, and therefore explanations thereof are omitted.

Figure 7:
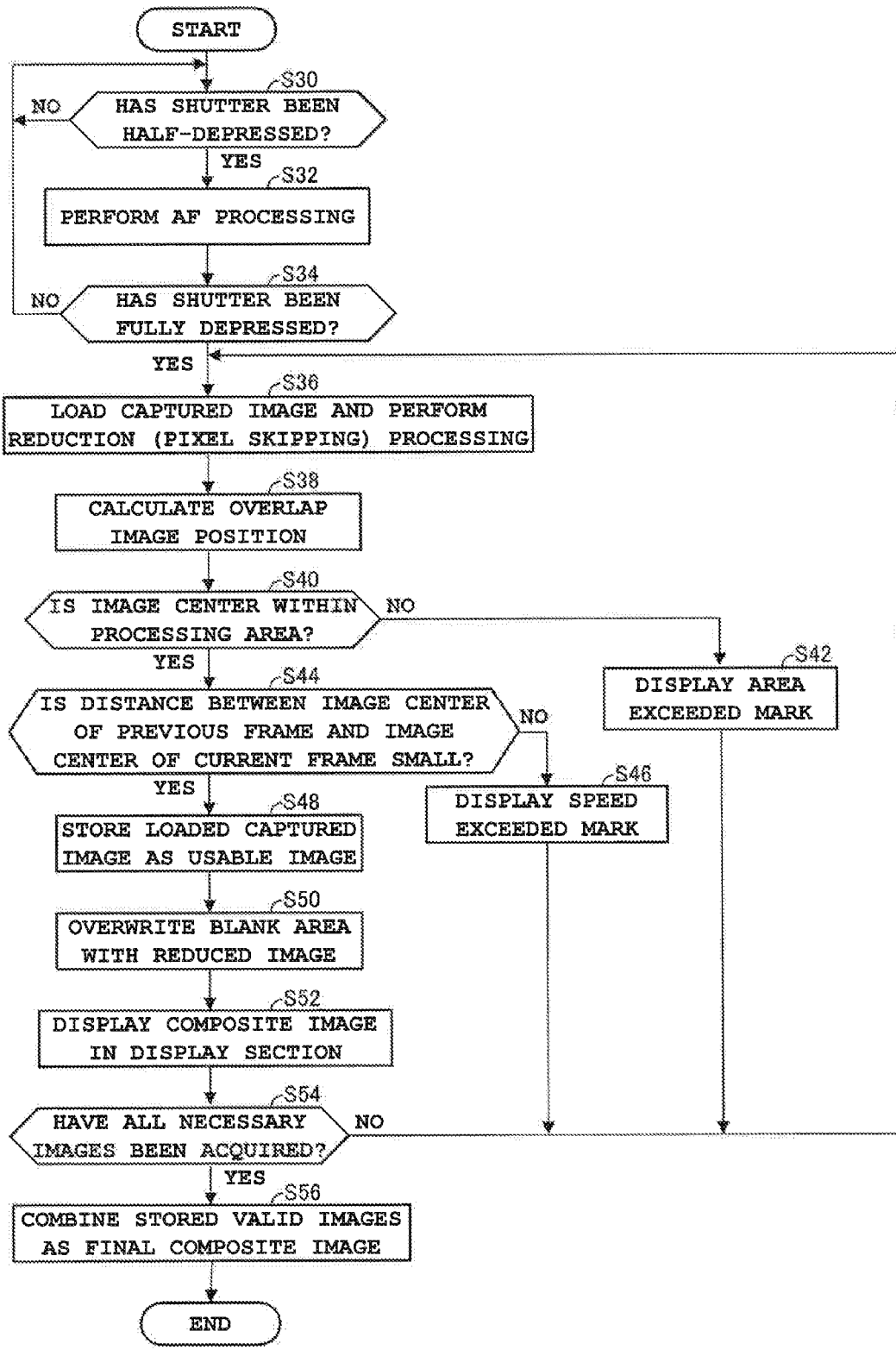
FIG. 7 is a flowchart for explaining operations of a digital camera according to a second embodiment.

FIG. 7 is a flowchart for explaining operations of the digital camera 1 according to the second embodiment. FIG. 8A and FIG. 8B, and FIG. 9A to FIG. 9C are schematic diagrams showing display examples of the image display section 15 of the digital camera 1 according to the second embodiment. First, the CPU 11 judges whether or not the shutter SW has been half-depressed (Step S30). When judged that the shutter SW has not been half-depressed, the CPU 11 repeatedly performs Step S30. Conversely, when judged that the shutter SW has been half-depressed, the CPU 11 performs AF processing (Step S32) and judges whether or not the shutter SW has been fully depressed (Step S34). When judged that the shutter SW has not been fully depressed, the CPU 11 repeatedly performs Step S30 and Step S32.

Conversely, when judged that the shutter SW has been fully depressed, the CPU 11 first loads the captured image, and generates its reduced image by performing reduction processing (pixel skipping) (Step S36). Next, the CPU 11 calculates an overlap image position using the reduced image (Step S38). Note that the calculation of the overlap image position herein refers to, for example, a calculation in which the center position (coordinates) of a reduced image is calculated and, if the reference image (or composite image) is already present, the reduced image of the current frame and the reference image (or composite image) are positioned so as to be partially overlapped with each other, and the position of the reduced image of the current frame within the canvas, and the distance between the center position of the reduced image of the current frame and the center position (coordinates) of the preceding captured image (reduced image) are calculated. Next, based on the center position of the reduced image and the position within the canvas, the CPU 11 judges whether or not the center position of the reduced image is within the processing area (within the canvas) (Step S40).

Figure 8A:
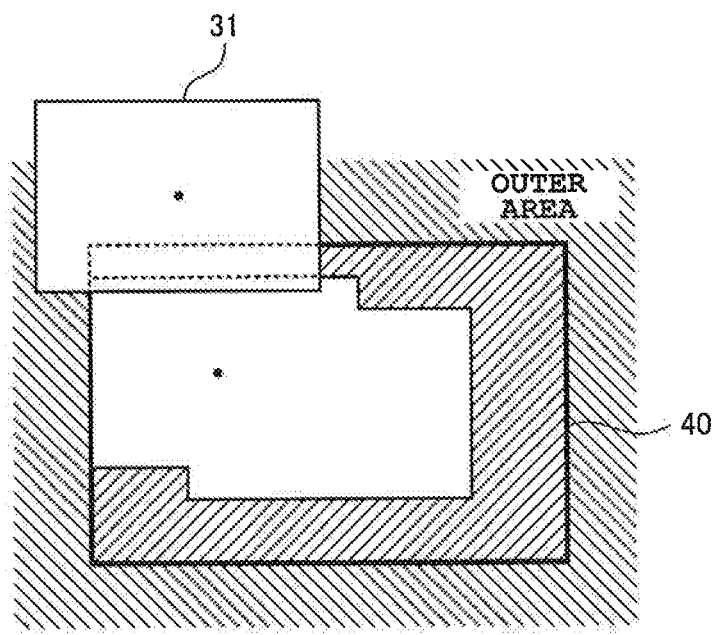
FIG. 8A and FIG. 8B are schematic diagrams showing a display example of an image display section of the digital camera according to the second embodiment.
Figure 8B:
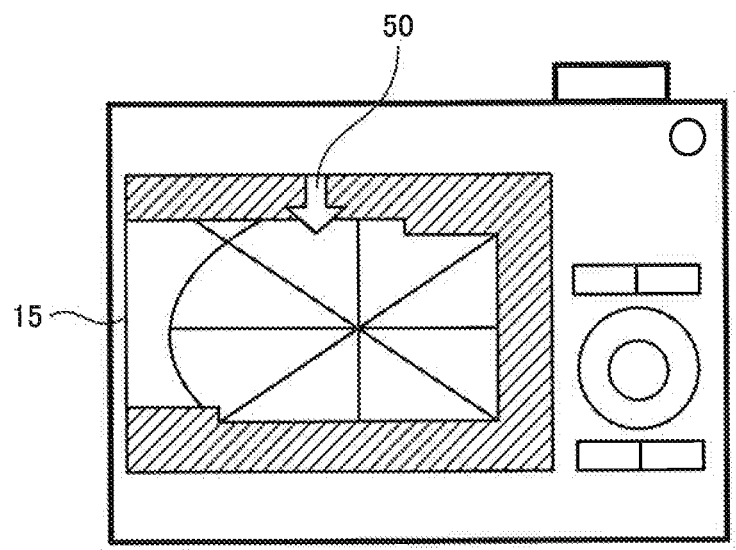

When judged that the center position of the reduced image is not within the processing area, the CPU 11 displays an area exceeded mark on the image display section 15 (Step S42). For example, when the center of the reduced image 31 of the current frame is outside of the canvas 40 that is the processing area as shown in FIG. 8A, the CPU 11 displays an arrow 50 indicating a direction to return to the processing area as the area exceeded mark, as shown in FIG. 8B. As a result, the user becomes aware that the image capturing direction of the digital camera 1 is off the processing area, and therefore can return the viewing angle to be captured to the processing area by moving the digital camera 1 in the direction indicated by the arrow 50. Then, the CPU 11 returns to Step S36, and performs the above-described processing on the captured image of the next frame. That is, image composition is not performed in this case.

Conversely, when judged that the center position of the reduced image is within the processing area, the CPU 11 judges whether or not the distance between the center position of the reduced image of the previous frame and the center position of the reduced image of the current frame is less than a predetermined threshold value (Step S44). Then, when judged that the distance is greater than the predetermined threshold, the CPU 11 displays a speed exceeded mark on the image display section 15 (Step S46), and after returning to Step S36, performs the above-described processing on the captured image of the next frame. That is, in this case as well, image composition is not performed.

Furthermore, in the invention, positioning is performed by a method such as block matching. However, when the moving speed of the digital camera 1 is high, the area of portions including the same content within two images used for positioning (the reduced image of the previous frame and the reduced image of the current frame) becomes small, and the positioning becomes inaccurate. Therefore, the moving speed of the digital camera 1 is required to be kept at a certain constant speed or lower. Accordingly, the user is explicitly notified of the moving speed (speed at which the image capturing direction changes) of the digital camera 1.

Figure 9A:
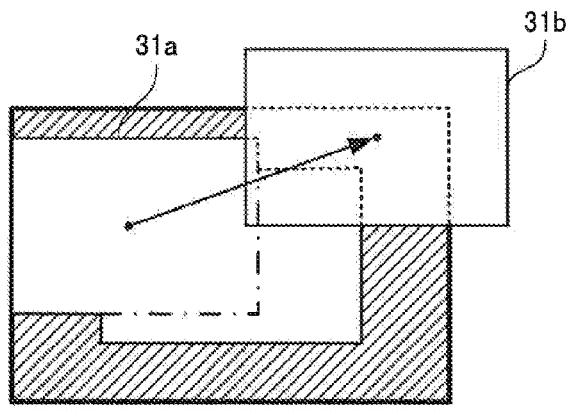
FIG. 9A to FIG. 9C are schematic diagrams showing operations of the digital camera and display examples of an image display section according to the second embodiment.
Figure 9B:
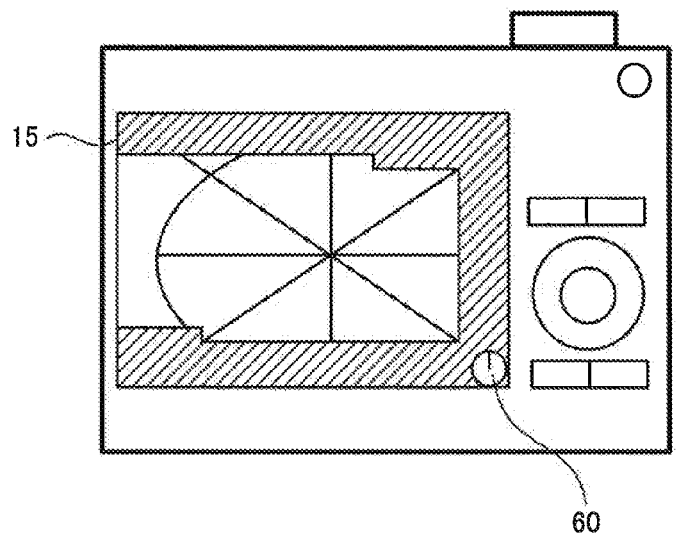

For example, as shown in FIG. 9A, when the distance between the center of a reduced image 31a of the previous frame and the center position of a reduced image 31b of the current frame is a predetermined threshold value or more, the overlapped portion of the two reduced images 31a and 31b becomes small. Therefore, the possibility of inaccurate positioning increases. Accordingly, a speed exceeded mark 60 is displayed on the image display section 15, as shown in FIG. 9B.

Figure 9C:
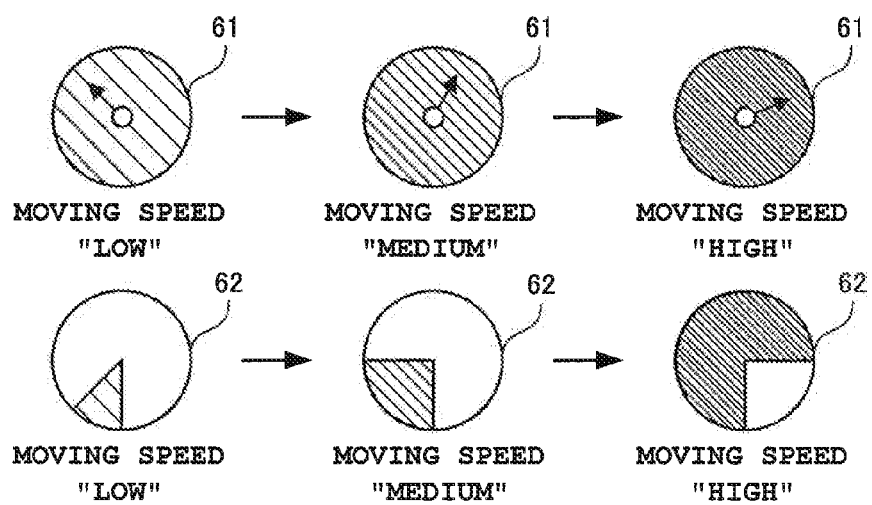

As shown in FIG. 9C, a tachometer-shaped mark 61 that changes the position of its meter needle and the color of the meter depending on the moving distance per unit time of an image may be used as the speed exceeded mark 60. Alternatively, a mark 62 that changes the area of its circular arc portion and the color of the circular arc depending on the moving distance per unit time of an image may be used. Furthermore, a bar graph (not shown) that changes the length or the color of its bar depending on the moving distance per unit time of an image may be used.

When the reduced image of the current frame is within the processing area and the moving distance is less than the predetermined threshold value, positioning that is sufficiently accurate for image composition can be performed. Therefore, the CPU 11 stores the loaded captured image (high resolution) as a usable image (Step S48), and overwrites the blank area that is an un-captured area with the reduced image (Step S50). That is, when the center position of the reduced image of the current frame is within the processing area, the reduced image of the current frame and the reference image (or composite image) are combined so as to be partially overlapped with each other, and the canvas 40 is overwritten with the composite image (when the captured image is a first captured image, the center portion of the canvas 40 is overwritten with the image as a reference image). Then, the CPU 11 displays the composite image on the image display section 15 (Step S52).

Next, the CPU 11 judges whether or not all necessary images have been acquired (for example, whether or not the number of images equivalent to a predetermined amount of time or a predetermined number of images has been acquired)

(Step S54). When judged that not all necessary images have been acquired, the CPU 11 returns to Step S36 and repeats the same processing on the captured image of the next frame. As a result, every time an image is captured and the center position of the captured image is within the processing area, the image and the reference image (or composite image) are combined, and the composite image is displayed on the image display section 15, in sequential order.

When all necessary images are acquired, the CPU 11 positions and combines the stored usable images that are the original images of the reduced images used for the image composition so that they are partially overlapped, as in the case of the image composition performed using the reduced images. Consequently, an image with a wide viewing angle such as that shown in FIG. 2 is generated (Step S56).

According to the above-described second embodiment, when an area outside of a processing area is being captured or when the movement of the digital camera 1 (change in the image capturing direction) is too fast, the user is notified thereof. Therefore, the user can easily know an approximate speed at which the digital camera 1 should be moved and a direction in which the digital camera 1 should be pointed, whereby an image with a wide viewing angle can be easily and efficiently acquired.

C. Third Embodiment

Next, a third embodiment of the present invention will be described.

The third embodiment is characterized in that, rather than continuously captured images (reduced images thereof) simply being combined and displayed, a predetermined area is trimmed from the composite image such that the reduced image of the current frame is positioned in the center of the image display section 15, and displayed on the image display section 15. Note that the structure of the digital camera 1 is the same as that in FIG. 1, and therefore explanations thereof are omitted.

Figure 10:
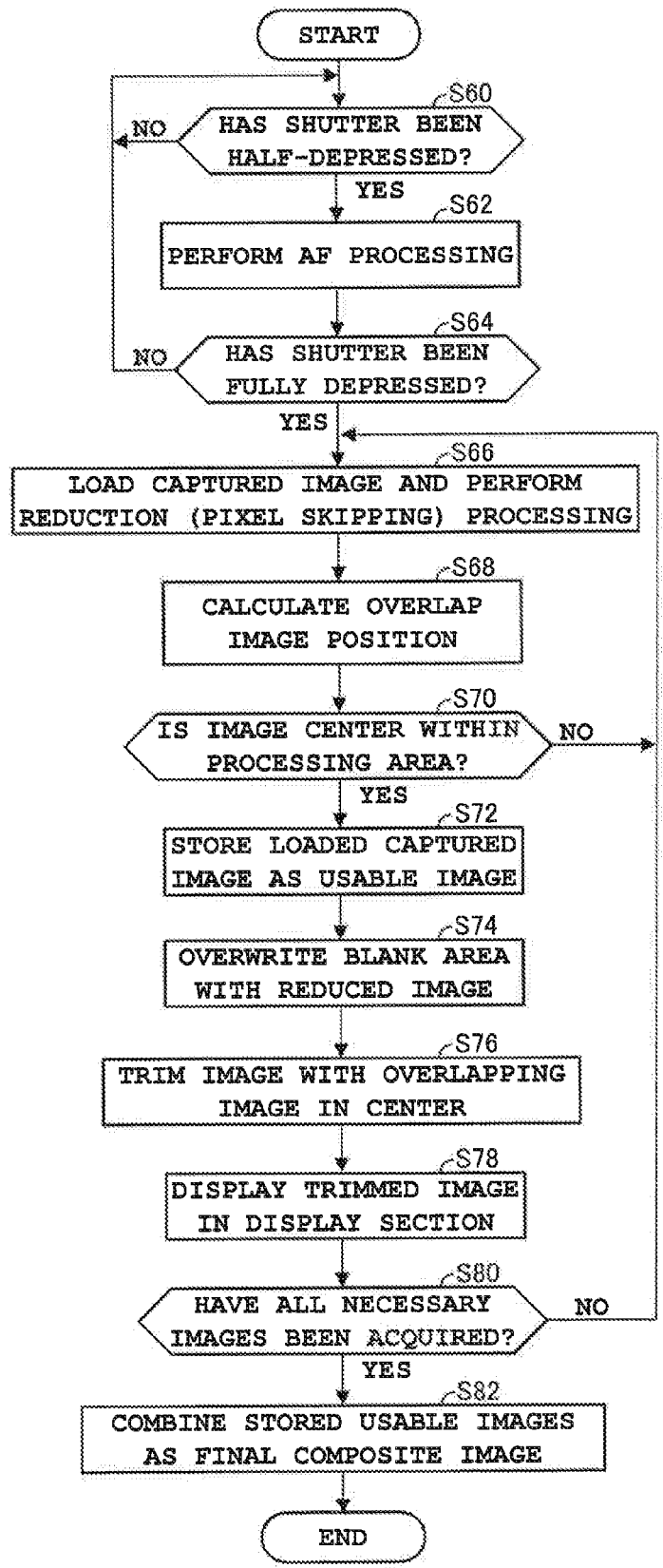
FIG. 10 is a flowchart for explaining operations of a digital camera according to a third embodiment.

FIG. 10 is a flowchart for explaining operations of the digital camera 1 according to the third embodiment. First, the CPU 11 judges whether or not the shutter SW has been half-depressed (Step S60). When judged that the shutter SW has not been half-depressed, the CPU 11 repeatedly performs Step S60. Conversely, when judged that the shutter SW has been half-depressed, the CPU 11 performs AF processing (Step S62) and judges whether or not the shutter SW has been fully depressed (Step S64). When judged that the shutter SW has not been fully depressed, the CPU 11 repeatedly performs Step S60 and Step S62.

Conversely, when judged that the shutter SW has been fully depressed, the CPU 11 first loads the captured image, and generates its reduced image by performing reduction processing (pixel skipping) (Step S66). Next, the CPU 11 calculates an overlap image position using the reduced image (Step S68). Note that the calculation of an overlap image position herein refers to, for example, a calculation in which the center position (coordinates) of a reduced image is calculated and, if the reference image (or composite image) is already present, the reduced image of the current frame and the reference image (or composite image) are positioned so as to be partially overlapped with each other, and the position of the reduced image of the current frame within the canvas is calculated. Next, based on the center position of the reduced image and the position within the canvas, the CPU 11 judges whether or not the center position of the reduced image is within the processing area (within the canvas) (Step S70). When judged that the center position of the reduced image is not within the processing area, the CPU 11 returns to Step S66 and repeats the same processing on the captured image of the next frame. Image composition is not performed in this case.

Conversely, when judged that the center position of the reduced image is within the processing area, the CPU 11 stores the loaded captured image (high resolution) as a usable image (Step S72), and overwrites the blank area that is an un-captured area with the reduced image (Step S74). That is, when the center position of the reduced image is within the processing area, the reduced image of the current frame and the reference image (or composite image) are combined so as to be partially overlapped with each other, and the canvas is overwritten with the composite image (when the captured image is a first captured image, the center portion of the canvas is overwritten with the image as a reference image).

Next, the CPU 11 trims the composite image to the display size of the image display section 15 with the reduced image of the current frame in the center (Step S76), and displays the trimmed composite image on the display section 15 (Step S78). Next, the CPU 11 judges whether or not all necessary images have been acquired (for example, whether or not the number of images equivalent to a predetermined amount of time or a predetermined number of images has been acquired) (Step S80).

When judged that not all necessary images have been acquired, the CPU 11 returns to Step S66 and repeats the same processing on the next captured image. As a result, every time an image is captured and the center position of the captured image is within the processing area, the image and the reference image (or composite image) are combined, and after a composite image is trimmed from the combined composite image to the display size of the image display section 15 with the reduced image of the current frame in the center, the trimmed composite image is displayed on the image display section 15, in sequential order.

When all necessary images are acquired, the CPU 11 positions and combines the stored usable images that are the original images of the reduced images used for the image composition so that they are partially overlapped, as in the case of the image composition performed using the reduced images. Consequently, an image with a wide viewing angle such as that shown in FIG. 2 is generated (Step S82).

Figure 11:
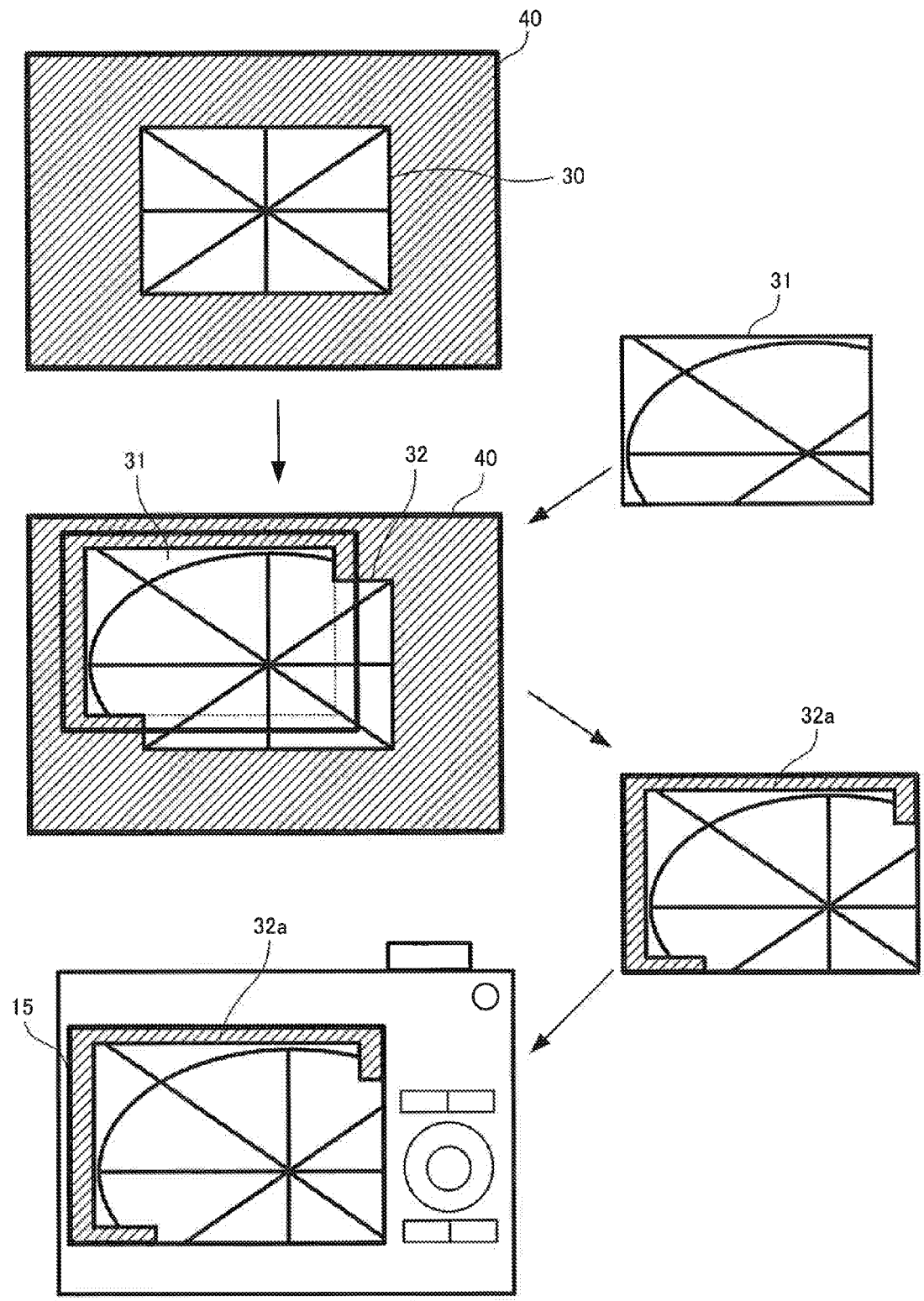
FIG. 11 is a schematic diagram showing operations of the digital camera and display examples of an image display section according to the third embodiment.

FIG. 11 is a schematic diagram showing operations of the digital camera 1 according to the third embodiment and display examples of the image display section 15. First, the reference image 30 that is a first captured image is acquired and then the second captured image (reduced image) 31 is acquired. Then, if the center position of the second reduced image 31 is in an image acquiring position, the second reduced image 31 is combined with the first reference image 30 so as to be partially overlapped with each other, and after the composite image 32 is trimmed to the display size of the image display section 15 with the reduced image 31 of the current frame in the center, a trimmed composite image 32a is displayed on the image display section 15.

According to the third embodiment, every time a captured image is combined with the reference image (or composite image), the reduced image of the current frame is displayed on the image display section 15 so as to be positioned in the center of the image display section 15, in sequential order. That is, the user who is capturing images while viewing the image display section 15 can see images centering on a direction in which the digital camera 1 is pointed, in real-time. As a result, the user can intuitively and easily know a direction in which the digital camera 1 should be pointed next in order to fill in blank areas that have not yet been captured, whereby an image with a wide viewing angle can be easily and efficiently acquired.

Note that, in the series of processing described above, the reference image moves on the screen of the image display section 15. Therefore, the reference image may be surrounded by a frame of a predetermined color to inform the user which portion of a composite image the reference image corresponds to.

D. Fourth Embodiment

Next, a fourth embodiment of the present invention will be described.

The fourth embodiment is characterized in that guidance is provided to the user during continuous image capturing which guides him how to move the digital camera 1 or leads him in a direction in which the digital camera 1 should be pointed, while indicating directions that have not yet been captured or directions that have already been captured. Note that the structure of the digital camera 1 is the same as that in FIG. 1, and therefore explanations thereof are omitted.

Figure 12:
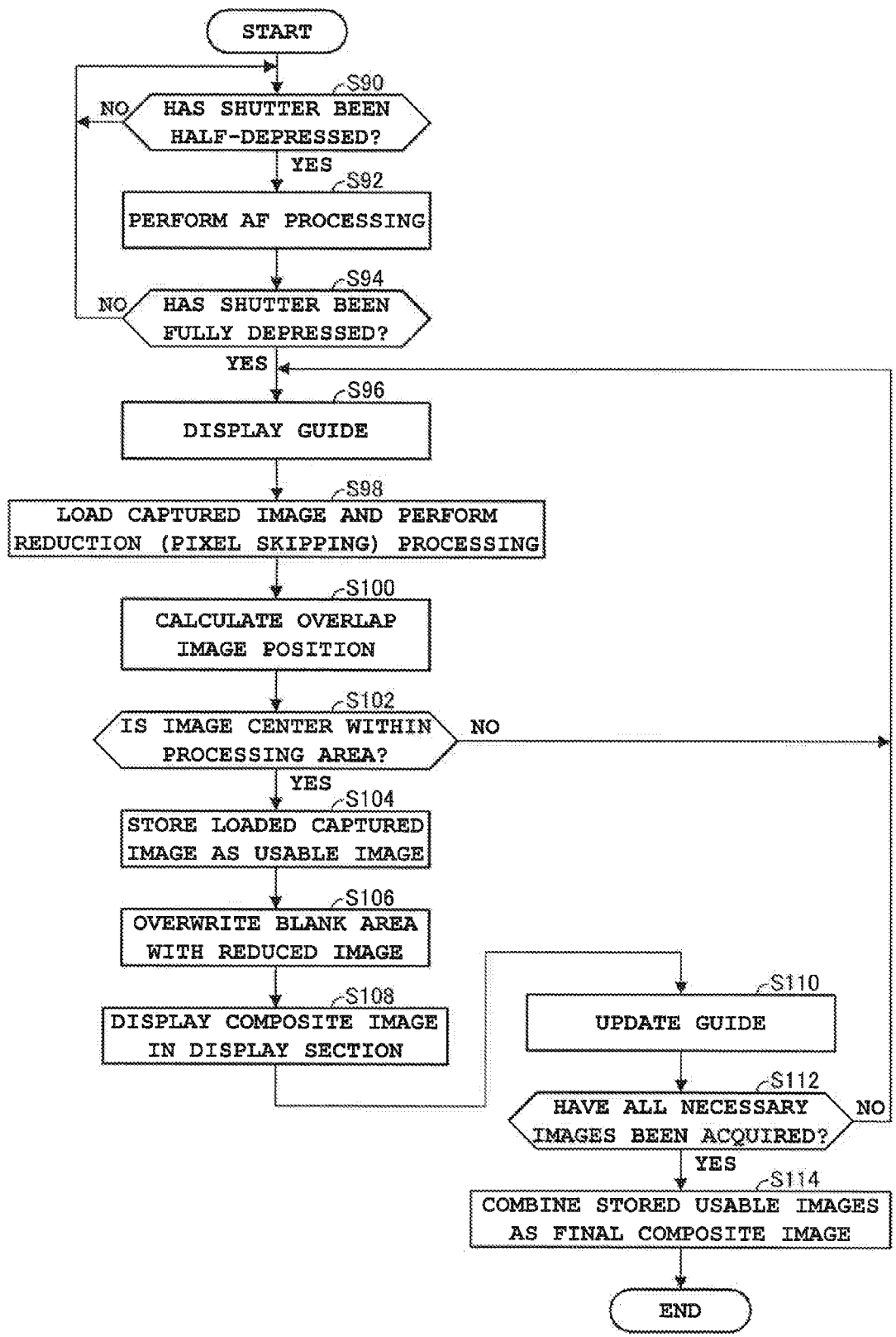
FIG. 12 is a flowchart for explaining operations of a digital camera according to a fourth embodiment.

FIG. 12 is a flowchart for explaining operations of the digital camera 1 according to the fourth embodiment. FIG. 13A to FIG. 13E are schematic diagrams showing operations of the digital camera 1 and display examples of the image display section 15 according to the fourth embodiment.

First, the CPU 11 judges whether or not the shutter SW has been half-depressed (Step S90). When judged that the shutter SW has not been half-depressed, the CPU 11 repeatedly performs Step S90. Conversely, when judged that the shutter SW has been half-depressed, the CPU 11 performs AF processing (Step S92) and judges whether the shutter SW has been fully depressed (Step S94). When judged that the shutter SW has not been fully depressed, the CPU 11 repeatedly performs Step S90 and Step S92.

Figure 13A:
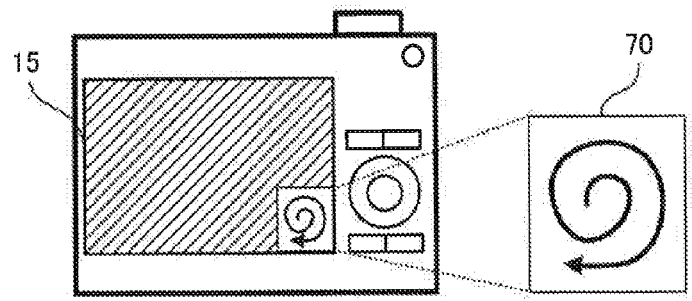
FIG. 13A to FIG. 13E are schematic diagrams showing operations of the digital camera and display examples of an image display section according to the fourth embodiment.
Figure 13B:
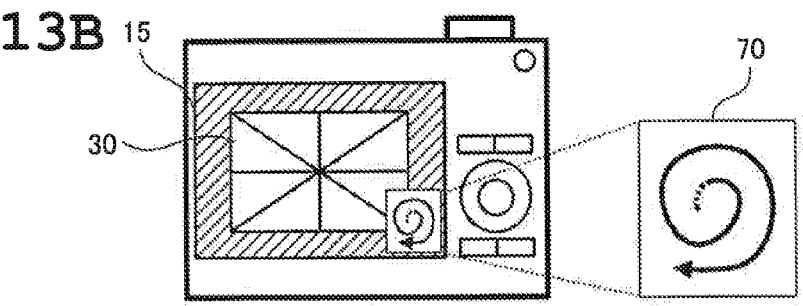

Conversely, when judged that the shutter SW has been fully depressed, the CPU 11 displays, for example, a spiral-shaped guide 70 in the lower right portion of the image display section 15, as shown in FIG. 13A (Step S96). Next, the CPU 11 loads the captured image, and generates its reduced image by performing reduction processing (pixel skipping) (Step S98). Then, the CPU 11 calculates an overlap image position (Step S100). Note that the calculation of the overlap image position herein refers to, for example, a calculation in which the center position (coordinates) of a reduced image is calculated and, if the reference image (or composite image) is already present, the reduced image of the current frame and the reference image (or composite image) are positioned so as to be partially overlapped with each other, and the position of the reduced image of the current frame within the canvas is calculated.

Next, based on the center position of the reduced image and the position within the canvas, the CPU 11 judges whether or not the center position of the reduced image is within the processing area (within the canvas) (Step S102). When judged that the center position of the reduced image is not within the processing area, the CPU 11 returns to Step S96, and repeats the same processing on the captured image of the next frame. Image composition is not performed in this case.

Conversely, when judged that the center position of the reduced image is within the processing area, the CPU 11 stores the loaded captured image (high resolution) as a usable image (Step S104), and overwrites the blank area that is an un-captured area with the reduced image (Step S106). That is, when the center position of the reduced image of the current frame is within the processing area, the reduced image of the current frame and the reference image (or composite image) are combined so as to be partially overlapped with each other, and the canvas 40 is overwritten with the composite image (when the captured image is a first captured image, the center portion of the canvas 40 is overwritten with the image as a reference image). Then, the CPU 11 displays the composite image on the image display section 15 (Step S108).

Next, in order to indicate that the portion where the reduced image of the current frame has been combined has already been captured, the CPU 11 changes the color of a portion of the guide 70 corresponding to this combined portion (in the examples in FIG. 13A to FIG. 13E, it is indicated by a change in the line type), and updates the guide 70 displayed on the image display section 15 (Step S110). For example, in FIG. 13B, a display example of the image display section 15 is shown which is displayed after the first reference image 30 is captured. At this time, the color of the guide 70 from the center of the spiral to the portion corresponding to the position of the first reference image has been changed (in the example in FIG. 13B, the line type of the guide 70 has been changed). The user is only required to watch the guide 70 and move the digital camera 1 along the spiral.

Figure 13C:
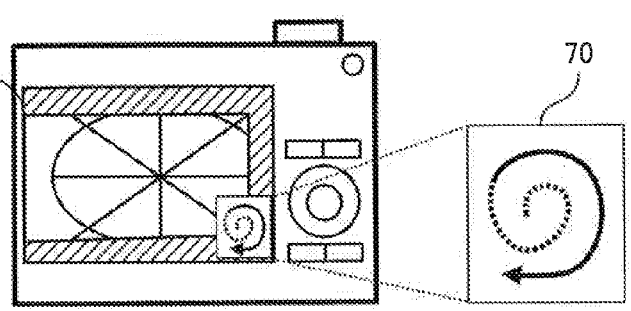
Figure 13D:
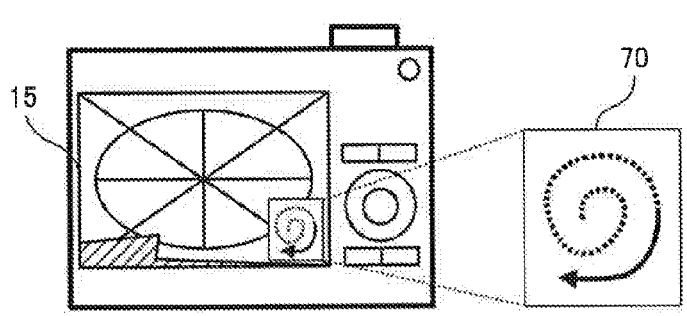

Then, after the second reduced image is combined, the color of the guide 70 from the center of the spiral to the portion corresponding to the position of the second captured image is changed as shown in FIG. 13C (in the example in FIG. 13C, the line type of the guide 70 has been changed). The user is only required to watch the guide 70 and move the digital camera 1 further along the spiral.

Figure 13E:
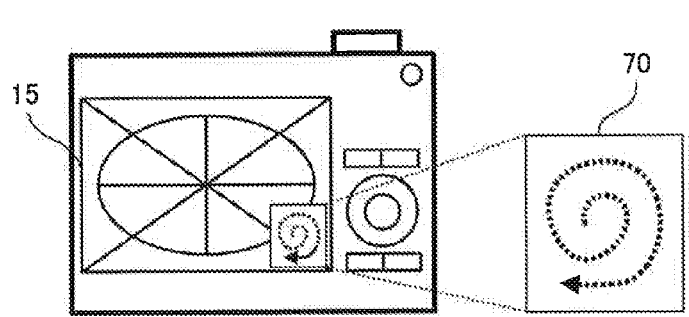

Next, the CPU 11 judges whether or not all necessary images have been acquired (for example, whether or not the number of images equivalent to a predetermined amount of time or a predetermined number of images has been acquired) (Step S112). When judged that not all necessary images have been acquired, the CPU 11 returns to Step S96 and repeats the same processing on the next captured image. As a result, every time a reduced image is combined with the reference image (or composite image), the color of a portion of the guide 70 corresponding to the position of the combined reduced image is changed, in sequential order. That is, when reduced images are sequentially combined with the reference image (or composite image), the status of the guide 70 changes to that shown in FIG. 13D, and consequently the overall guide 70 changes as shown in FIG. 13E to indicate that a composite image covering the entire screen has been acquired.

When all necessary images are acquired, the CPU 11 positions and combines the stored usable images that are the original images of the reduced images used for the image composition so that they are partially overlapped, as in the case of the image composition performed using the reduced images. Consequently, an image with a wide viewing angle such as that shown in FIG. 2 is generated (Step S114).

Figure 14A:
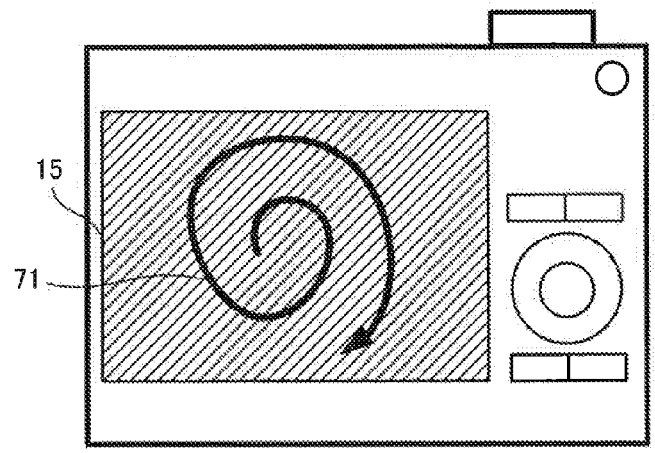
FIG. 14A to FIG. 14C are schematic diagrams showing variation examples of the fourth embodiment.
Figure 14B:
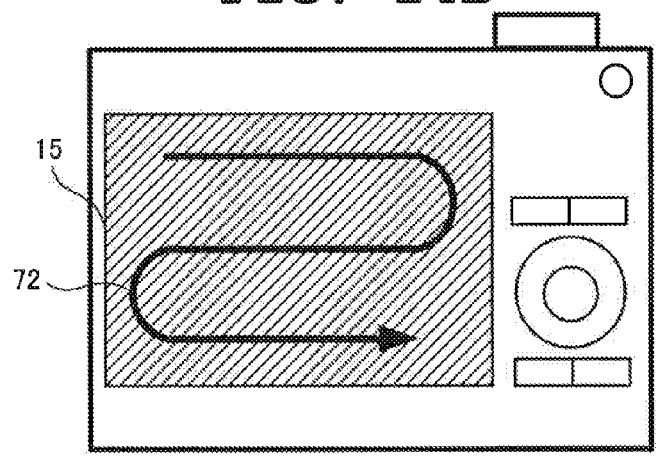
Figure 14C:
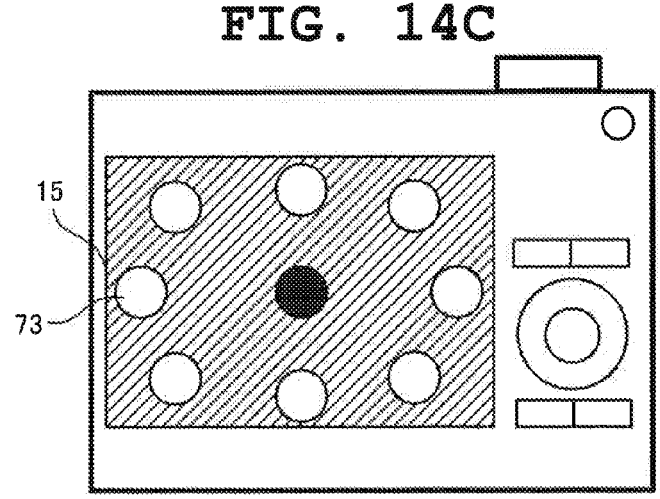

FIG. 14A to FIG. 14C are schematic diagrams showing variation examples of the fourth embodiment. In the fourth embodiment, the guide 70 is used which has a spiral shape and is displayed in the right-hand corner of the image display section 15. However, this is not limited thereto. For example, a guide 71 may be used that is displayed over the entire screen of the image display section 15 so as to be overlapped with a composite image as shown in FIG. 14A, or a guide 72 may be used that has a Z-shape snaking from the upper-left portion of the screen as shown in FIG. 14B. In the example shown in FIG. 14B, the first reference image corresponds to the upper-left corner that is the starting point of the guide 72. Alternatively, as shown in FIG. 14C, circular guides 73 may be used which are placed in positions to be captured and each of which changes its color when the position corresponding thereto is captured in order to indicate whether or not the position has been captured. That is, the guide 70 may have any configuration as long as it has a shape in accordance with the ratio of the viewing angle (area) of a composite image to be generated in relation to that of the reference image.

According to the above-described fourth embodiment, a guide is displayed to guide the user during continuous image capturing which guides him how to move the digital camera 1 or leads him in a direction in which the digital camera 1 should be pointed, while indicating directions that have not yet been captured or directions that have already been captured. Therefore, the user who is capturing images while viewing the image display screen 15 can intuitively and easily know how to move the digital camera 1 or a direction in which the digital camera 1 should be pointed next, whereby an image with a wide viewing angle can be easily and efficiently acquired.

Note that the configurations of the above-described first embodiment to fourth embodiment can be combined. For example, the trimming processing of the third embodiment and/or the guide display of the fourth embodiment may be added to the display processing for the area exceeded mark and the speed exceeded mark of the second embodiment. In addition, for example, an acceleration sensor that detects the movement of the digital camera may be further included in the above-described first embodiment to fourth embodiment and, when images sequentially captured by continuous image capturing are to be overlapped, the overlap image position may be calculated taking into consideration movement detected by the acceleration sensor.

Also, in the above-described first embodiment to fourth embodiment, a digital camera is described as the imaging apparatus. However, the present invention is not limited thereto, and is applicable to any electronic device having an imaging function, such as a mobile phone. In addition, a configuration may be used in which the present invention is actualized by the CPU 11 running a predetermined program stored in a program memory (not shown).

While the present invention has been described with reference to the preferred embodiments, it is intended that the invention be not limited by any of the details of the description therein but includes all the embodiments which fall within the scope of the appended claims.

What is claimed is:

1. An image capturing apparatus comprising:
   an image sensor which sequentially captures an object and sequentially outputs plural pieces of image data while the image sensor is being moved in a predetermined direction; and
   a CPU which is configured to:
   perform first display control to display, on a display, a processing area for generating composite image data to be generated from the plural pieces of image data output by the image sensor, wherein the processing area shows a predetermined range to be overwritten with the composite image data;
   judge whether a specific position of a photographing range of the image sensor is within the processing area in a state in which another part of the photographing range which does not include the specific position is within the processing area; and
   perform second display control to display, on the display, a directional indicator image indicating a direction to return the specific position of the photographing range to the processing area when it is judged that the specific position of the photographing range is not within the processing area in the state in which said another part of the photographing range which does not include the specific position is within the processing area, wherein the directional indicator image is displayed so as to be superimposed on the processing area.

2. The image capturing apparatus according to claim 1, wherein in the second display control, the CPU displays, on the display, an arrow image showing a direction opposite to a direction in which the specific position of the photographing range has gone out of the processing area, as the directional indicator image.

3. The image capturing apparatus according to claim 1, wherein in the generating, the CPU does not use, for generating the composite image data, a piece of image data captured at a time when it is judged that the specific position of the photographing range is not within the processing area.

4. The image capturing apparatus according to claim 1, wherein in the second display control, the CPU performs control to display, on the display, the directional indicator image along with an area which has not yet been captured by the image sensor and which is a part of the processing area.

5. The image capturing apparatus according to claim 1, wherein the CPU performs control to display, on the display, the processing area and the photographing range such that the processing area shows a whole display range of the display and the photographing range shows a part of the whole display range.

6. The image capturing apparatus according to claim 1, wherein the CPU is further configured to calculate a center position of the photographing range of the image sensor, as the specific position; and
   wherein in the judging, the CPU judges whether the calculated center position of the photographing range of the image sensor is within the processing area.

7. The image capturing apparatus according to claim 1, wherein the CPU is further configured to acquire a center position of the photographing range of the image sensor, as the specific position; and
   wherein in the judging, the CPU judges whether the acquired center position of the photographing range of the image sensor is within the processing area.

8. The image capturing apparatus according to claim 1, wherein the directional indicator image is superimposed on a region of the processing area where image data has not been combined to generate the composite image data due to the specific position of the photographing range of the image sensor being outside of the processing area.

9. The non-transitory computer readable storage medium according to claim 1, wherein the specific position is a predetermined position.

10. A method of specifying images in an image processing apparatus having an image sensor, the method comprising:
    acquiring plural pieces of image data sequentially output by the image sensor while the image sensor is being moved in a predetermined direction;
    performing first display control to display, on a display, a processing area for generating composite image data to be generated from the plural pieces of image data output by the image sensor, wherein the processing area shows a predetermined range to be overwritten with the composite image data;
    judging whether a specific position of a photographing range of the image sensor is within the processing area in a state in which another part of the photographing range which does not include the specific position is within the processing area; and performing second display control to display, on the display, a directional indicator image indicating a direction to return the specific position of the photographing range to the processing area when it is judged that the specific position of the photographing range is not within the processing area in the state in which said another part of the photographing range which does not include the specific position is within the processing area, wherein the directional indicator image is displayed so as to be superimposed on the processing area.

11. The method according to claim 10, further comprising acquiring a center position of the photographing range of the image sensor, as the specific position;
wherein in the judging, it is judged whether the acquired center position of the photographing range of the image sensor is within the processing area.

12. The method according to claim 10, wherein the directional indicator image is superimposed on a region of the processing area where image data has not been combined to generate the composite image data due to the specific position of the photographing range of the image sensor being outside of the processing area.

13. The method according to claim 10, wherein the specific position is a predetermined position.

14. A non-transitory computer readable storage medium having a program stored thereon that is executable by a computer to control the computer to perform functions comprising:
acquiring plural pieces of image data sequentially output by an image sensor while the image sensor is being moved in a predetermined direction;
performing first display control to display, on a display, a processing area for generating composite image data to be generated from the plural pieces of image data output by the image sensor, wherein the processing area shows a predetermined range to be overwritten with the composite image data;
judging whether a specific position of a photographing range of the image sensor is within the processing area in a state in which another part of the photographing range which does not include the specific position is within the processing area; and
performing second display control to display, on the display, a directional indicator image indicating a direction to return the specific position of the photographing range to the processing area when it is judged that the specific position of the photographing range is not within the processing area in the state in which said another part of the photographing range which does not include the specific position is within the processing area, wherein the directional indicator image is displayed so as to be superimposed on the processing area.

15. The non-transitory computer readable storage medium according to claim 14, wherein the program controls the computer to perform a further function comprising acquiring a center position of the photographing range of the image sensor, as the specific position;
wherein in the judging, it is judged whether the acquired center position of the photographing range of the image sensor is within the processing area.

16. The non-transitory computer readable storage medium according to claim 14, wherein the directional indicator image is superimposed on a region of the processing area where image data has not been combined to generate the composite image data due to the specific position of the photographing range of the image sensor being outside of the processing area.

17. The non-transitory computer readable storage medium according to claim 14, wherein the specific position is a predetermined position.

18. An image capturing apparatus comprising:
an image sensor which sequentially captures an object and sequentially outputs plural pieces of image data while the image sensor is being moved in a predetermined direction; and
a CPU which is configured to:
perform first display control to display, on a display, a processing area for generating composite image data to be generated from the plural pieces of image data output by the image sensor, wherein the processing area shows a predetermined range to be overwritten with the composite image data;
judge whether a first portion of a photographing range of the image sensor is outside the processing area in a state in which a second portion of the photographing range which does not include the first portion is within the processing area; and
perform second display control to display, on the display, a directional indicator image indicating a direction to return the first portion of the photographing range to the processing area when it is judged that the first portion of the photographing range is outside the processing area in the state in which the second portion of the photographing range which does not include the first portion is within the processing area, wherein the directional indicator image is displayed so as to be superimposed on the processing area.

* * * * *

UNITED STATES PATENT AND TRADEMARK OFFICE
CERTIFICATE OF CORRECTION

PATENT NO.       : 9,253,398 B2                                  Page 1 of 1
APPLICATION NO.  : 14/514006
DATED            : February 2, 2016
INVENTOR(S)      : Kosuke Matsumoto et al.

It is certified that error appears in the above-identified patent and that said Letters Patent is hereby corrected as shown below:

In the Claims

Column 14, line 48, change "non-transitory computer readable storage medium" to --image capturing apparatus--.

Signed and Sealed this
Sixteenth Day of August, 2016

Michelle K. Lee
*Director of the United States Patent and Trademark Office*